United States Patent
Eldridge et al.

(10) Patent No.: US 7,965,406 B2
(45) Date of Patent: *Jun. 21, 2011

(54) TIME MULTIPLEXED IMAGE DATA DECOMPRESSION CIRCUIT

(75) Inventors: George L. Eldridge, Long Beach, CA (US); Munir G. Salfity, Torrance, CA (US); John Cheng Ming Tou, Rancho Palos Verdes, CA (US)

(73) Assignee: Xerox Corporation, Norwalk, CT (US)

(*) Notice: Subject to any disclaimer, the term of this patent is extended or adjusted under 35 U.S.C. 154(b) by 423 days.

This patent is subject to a terminal disclaimer.

(21) Appl. No.: 12/010,388

(22) Filed: Jan. 24, 2008

(65) Prior Publication Data

US 2008/0144140 A1  Jun. 19, 2008

Related U.S. Application Data (62) Division of application No. 10/281,422, filed on Oct. 25, 2002, now Pat. No. 7,349,135.

(51) Int. Cl.
*G06F 3/12* (2006.01)
*H04N 1/46* (2006.01)

(52) U.S. Cl. ...................... 358/1.15; 358/515

(58) Field of Classification Search ............ 358/1.9, 358/1.15, 1.16, 425, 426.01, 515, 539, 518, 358/524; 710/22; 711/158; 355/1.1, 1.8, 355/1.13, 1.15, 1.16
See application file for complete search history.

(56) References Cited

U.S. PATENT DOCUMENTS

| | | | |
|---|---|---|---|
| 4,985,850 A | 1/1991 | Okamoto | |
| 5,398,066 A | 3/1995 | Martinez-Uriegas et al. | |
| 5,552,898 A | 9/1996 | Deschuytere | |
| 5,588,093 A | 12/1996 | Harrington | |
| 5,619,233 A | 4/1997 | Harrington | |
| 5,642,208 A | 6/1997 | Takahashi et al. | |
| 5,687,303 A | 11/1997 | Motamed et al. | |
| 5,778,092 A * | 7/1998 | MacLeod et al. | 382/176 |
| 5,793,885 A | 8/1998 | Kasson | |
| 5,915,079 A | 6/1999 | Vondran et al. | |
| 5,956,467 A | 9/1999 | Rabbani et al. | |
| 5,999,710 A | 12/1999 | Smith et al. | |
| 6,038,033 A | 3/2000 | Bender et al. | |
| 6,078,696 A | 6/2000 | Nguyen et al. | |
| 6,084,688 A | 7/2000 | Stumbo et al. | |
| 6,118,898 A | 9/2000 | Chen et al. | |

(Continued)

FOREIGN PATENT DOCUMENTS

| EP | 969412 | 1/2000 |
|---|---|---|

(Continued)

*Primary Examiner* — Gabriel I Garcia
(74) *Attorney, Agent, or Firm* — Oliff & Berridge, PLC (57) ABSTRACT

A circuit which uses a compressor to divide each separation image into 8-line strips, and to independently compress each strip, a single decompressor to decompress two or more color image separations, strip by strip, by interleaving them, and to apply them to two or more print heads, one for each color separation. DMA from a main memory is used to apply both separations to the decompressor, and the decompressor output is demultiplexed into two print heads, one for each separation. This is done to drive each color separation simultaneously in a single-pass color printer. Multiplexing logic controls the DMA into the decompressor and the output of the decompressor into separate buffers for each color separation. Additional logic uses the page and line sync from each print head to synchronize the accessing of the correct image raster from buffers at the output of the decompressor to the associated print head.

17 Claims, 6 Drawing Sheets

U.S. PATENT DOCUMENTS

| | | |
|---|---|---|
| 6,205,252 B1 | 3/2001 | Nguyen et al. |
| 6,272,252 B1 | 8/2001 | Eldridge et al. |
| 6,307,977 B1 | 10/2001 | Eldridge et al. |
| 6,470,052 B1 | 10/2002 | Nguyen et al. |
| 6,529,553 B2 | 3/2003 | Nguyen et al. |
| 6,583,887 B1 | 6/2003 | Clouthier et al. |
| 6,628,419 B1 | 9/2003 | So et al. |
| 6,757,437 B1 | 6/2004 | Keith et al. |
| 7,003,585 B2 | 2/2006 | Phong et al. |
| 7,046,387 B1 | 5/2006 | Yagishita et al. |
| 7,050,197 B1 | 5/2006 | Szumla et al. |
| 7,349,135 B2 * | 3/2008 | Eldridge et al. ............ 358/515 |
| 2003/0103225 A1 | 6/2003 | Hyodo et al. |
| 2003/0160984 A1 | 8/2003 | Clothier et al. |
| 2004/0184079 A1 | 9/2004 | Sakamoto |
| 2004/0239961 A1 | 12/2004 | Birnbaum |
| 2005/0225801 A1 | 10/2005 | Sadowara |

FOREIGN PATENT DOCUMENTS

| | | |
|---|---|---|
| EP | 1003328 | 5/2000 |
| EP | 1004975 | 5/2000 |
| JP | 10191085 | 7/1998 |
| JP | 2000078021 | 3/2000 |
| JP | 2000165681 | 6/2000 |
| JP | 2000165682 | 6/2000 |

* cited by examiner

TIME MULTIPLEXED IMAGE DATA DECOMPRESSION CIRCUIT

This is a Division of application Ser. No. 10/281,422 filed Oct. 25, 2002 (now U.S. Pat. No. 7,349,134). The disclosure of the prior application is hereby incorporated by reference herein in its entirety.

CROSS-REFERENCE TO RELATED APPLICATION

Reference is made to commonly-assigned co-pending U.S. patent application Ser. No. 09/215,717, by Eldridge, et al, filed Dec. 18, 1998, entitled: Time Multiplexed Image Data Decompression Circuit, the disclosure of which is incorporated herein.

BACKGROUND OF THE INVENTION

Digital color imaging on high-resolution printers such as xerographic printers requires handling large amounts of video data for each page. The color image for each page is typically represented as a set of four color planes, usually cyan, magenta, yellow, and black. For a single-pass printer, the data for each color plane must be presented to the printer at the same time. The actual start of each color plane will be slightly different depending on the position of the imaging stations in the printer.

It is often desirable to reduce the size of the color images to reduce the amount of solid state memory required to buffer the images, reduce the amount of disk space to store the images, and speed up transfer of the images within the printing system. This is done by compressing the page images after they are generated and decompressing them immediately before they are needed for printing.

There are a number of different compression schemes to reduce the size of the page images. One such method is to use the lossy or lossless JPEG compression standard. Better compression can be achieved with more complex algorithms such as the separation difference algorithm described by Rabbani in U.S. Pat. No. 5,956,467. Another technique to obtain better compression is to segment the image into regions and use a different compression algorithm for each region. Regardless of the specific technique used to improve the compression, the logic for decompression can become very complex and expensive.

A single-pass color printer requires the decompressed data for all color planes at the same time. The conventional way to provide decompressed data for each color plane simultaneously is to have a separate copy of the decompression logic for each color plane.

This method has a cost disadvantage if the decompression logic is expensive, since the cost of the decompression logic is multiplied by the number of color planes.

The present invention provides a method of time sharing a single implementation of the decompression logic operating at four times the speed so that decompressed image data is available for all four color planes simultaneously. The present invention accomplishes the time-sharing using a minimal amount of buffering and logic. The unit of processing in the decompressor is one strip. A strip is eight scan lines of image data from one color plane. The decompressor will take in the compressed data for one strip, decompress it, and output the raw video data. This requires that the compression operation divide the image data for each separation into independent strips. The input to the decompressor must be controlled so that Direct Memory Access (DMA) to the proper strip of the proper color plane is loaded when needed. The output from the decompressor must be directed to the proper buffer. There are separate buffers for each of the four color separations.

The four color separation images are typically stored in main memory as four complete compressed images, but are needed at different times by the print heads. For example, if the first scan line of the page needs some of each color, but the print heads are separated by a few inches, then each color for the first scan line must be separated by the amount of time that it takes for the leading edge of the paper to travel from one head to the next.

The common method of handling this is to have four channels, one for each separation. As the paper arrives at each head, a page sync signal for that separation is generated, and the image is DMAed from memory through a decompressor to a buffer for the associated print head. Since the entire image for each separation is compressed and stored as a single data string, once the decompression is started, it must continue for the entire image. The result is the requirement for four decompressors and image buffers, one for each print head.

If a single decompressor that operates at four times the data rate needed for each color separation and the single decompressor can be time-shared using multiplexing logic, then the single decompressor can replace four decompressors thus reducing the cost of the printing system.

SUMMARY OF THE INVENTION

In this process, the first step is to divide each separation image into a number of strips, eight scan lines per strip in the described embodiment. Then each strip is individually compressed before storage in the main memory.

Then, in use, as the paper travels past each print head, one strip at a time of data from each of the separations is accessed from memory by one decompressor, decompressed, and sent through a demultiplexer which divides the single output stream of decompressed data into its four separations, and finally to four buffers, each supplying data to a print head.

The advantage is that, because the data is divided into strips, one decompressor can be used for all four channels at the same time. The amount of buffering required for each color channel is only two strips. The disadvantages are that the compression ratio is slightly reduced by breaking up the data into independent strips, and that the input to the decompressor must be redesigned to compute the four sets of DMA addresses, and must be fast enough to decompress four channels of data at printer speed. To the extent that this can not be done, it would still be useful to have one decompressor for two channels rather than four. In either case, the loss of compression and additional complexity of the logic controlling the decompressor would be more than offset by being able to use fewer decompressors.

DETAILED DESCRIPTION OF THE INVENTION

Figure 1:
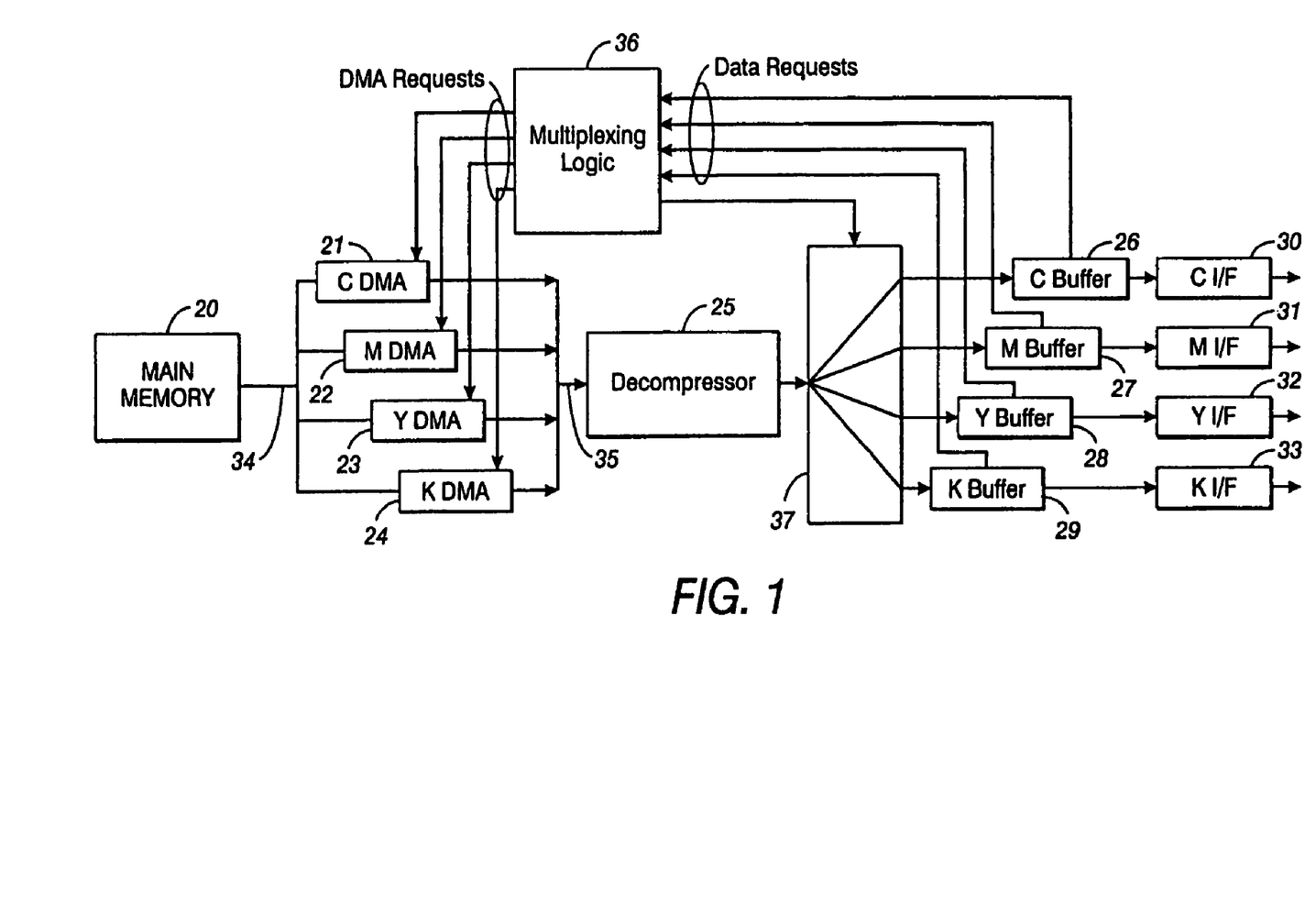
FIG. 1 is an overall block diagram of the system.
Figure 4:
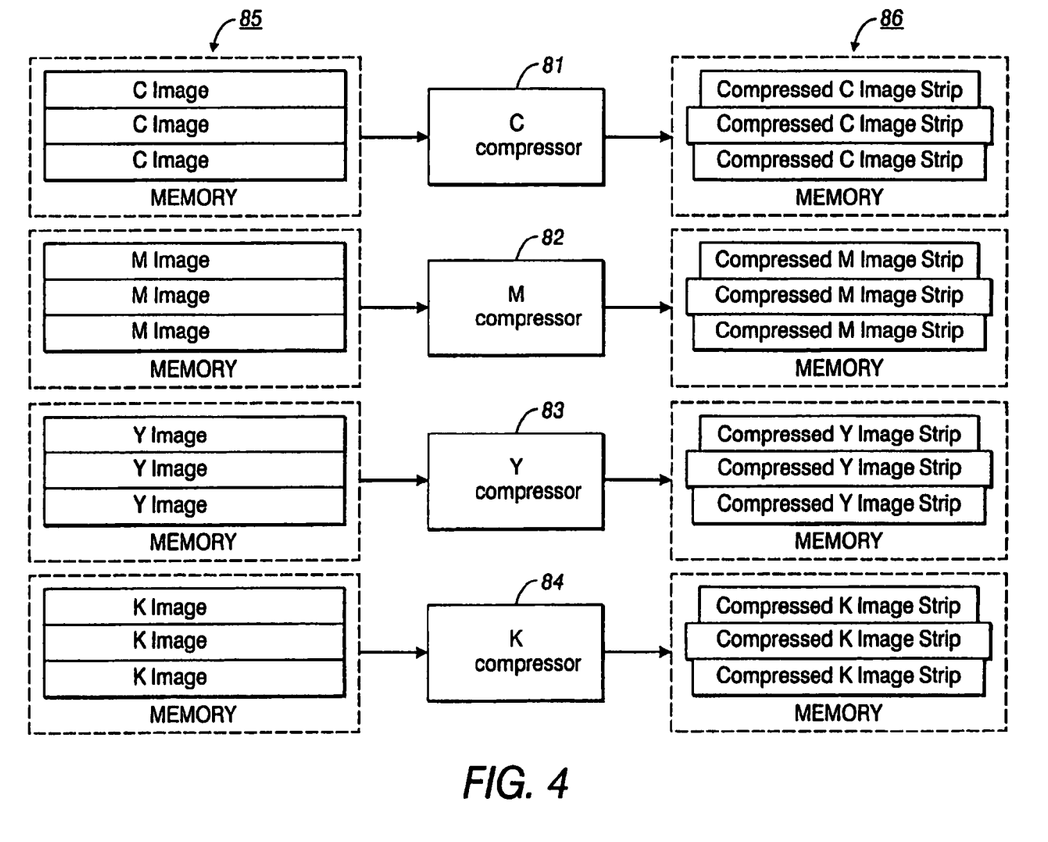
FIG. 4 is a diagram of the compressor devices.

As shown in FIG. 4, compressors 81-84 receive image data in the form of four color separations, divide each image into 8-line strips, individually compresses each strip 85 and stores the result 86 in one of four buffers, which could be four parts of the same main memory, each part corresponding to a color separation, cyan, magenta, yellow and black. As shown in FIG. 1, the decompressor 25 can access any one of the four images through a data bus 34-35, by using direct memory access (DMA) as shown by four DMA engines 21-24. The decompressor DMA engines compute the location of a compressed data strip, access it, send it to the decompressor that decompresses it and sends it through the demultiplexer 37, to the associated buffer 26-29, where it waits until the interface unit 30-33 requests it. At that point it is sent to the corresponding print head of the image output terminal (IOT). The multiplexing logic 36 controls the DMA engines 21-24 and the demultiplexer 37 to route the data to the proper buffer 26-29.

Figure 2:
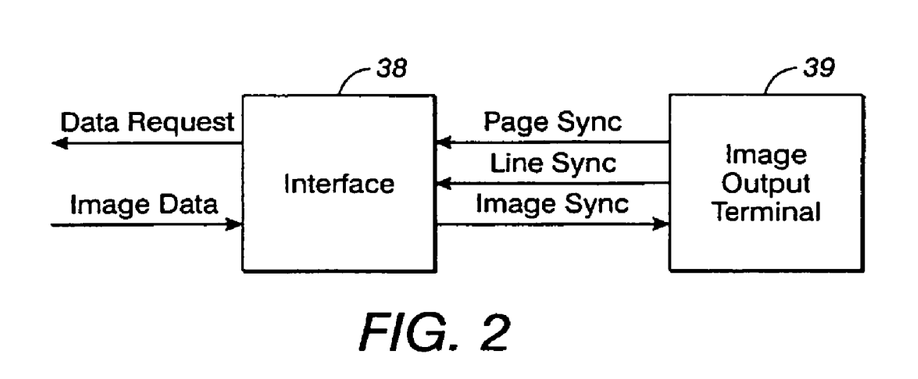
FIG. 2 shows the signals between the printer and its interface.

For timing purposes, each printing head of the IOT generates page and line sync signals as shown in FIG. 2. As the page enters each print head, a page sync signal is generated, and as each scan line is started, a line sync signal is generated. As each line of data is needed, it is supplied by the corresponding interface unit (I/F) 38 to the IOT 39.

The multiplexing logic 36 of FIG. 1 receives data requests from the buffers 26-29 and makes sure that the data is contained in the buffers 26-29 before it is needed by the IOT. As part of this task, the logic activates the correct DMA engine to bring in the compressed strip from main memory. The multiplexing logic connects the decompressor output to the correct buffer 26-29. The multiplexing logic must arbitrate among the data requests received from the buffers 26-29. The buffer with the highest priority is given the decompressor for the length of time required to decompress one strip. At the end of decompressing the one strip, the multiplexing logic again arbitrates among the data requests from the buffers for the next channel to use the decompressor. The order that the compressed strips are accessed is not predetermined, but is in response to the data requests.

Figure 3:
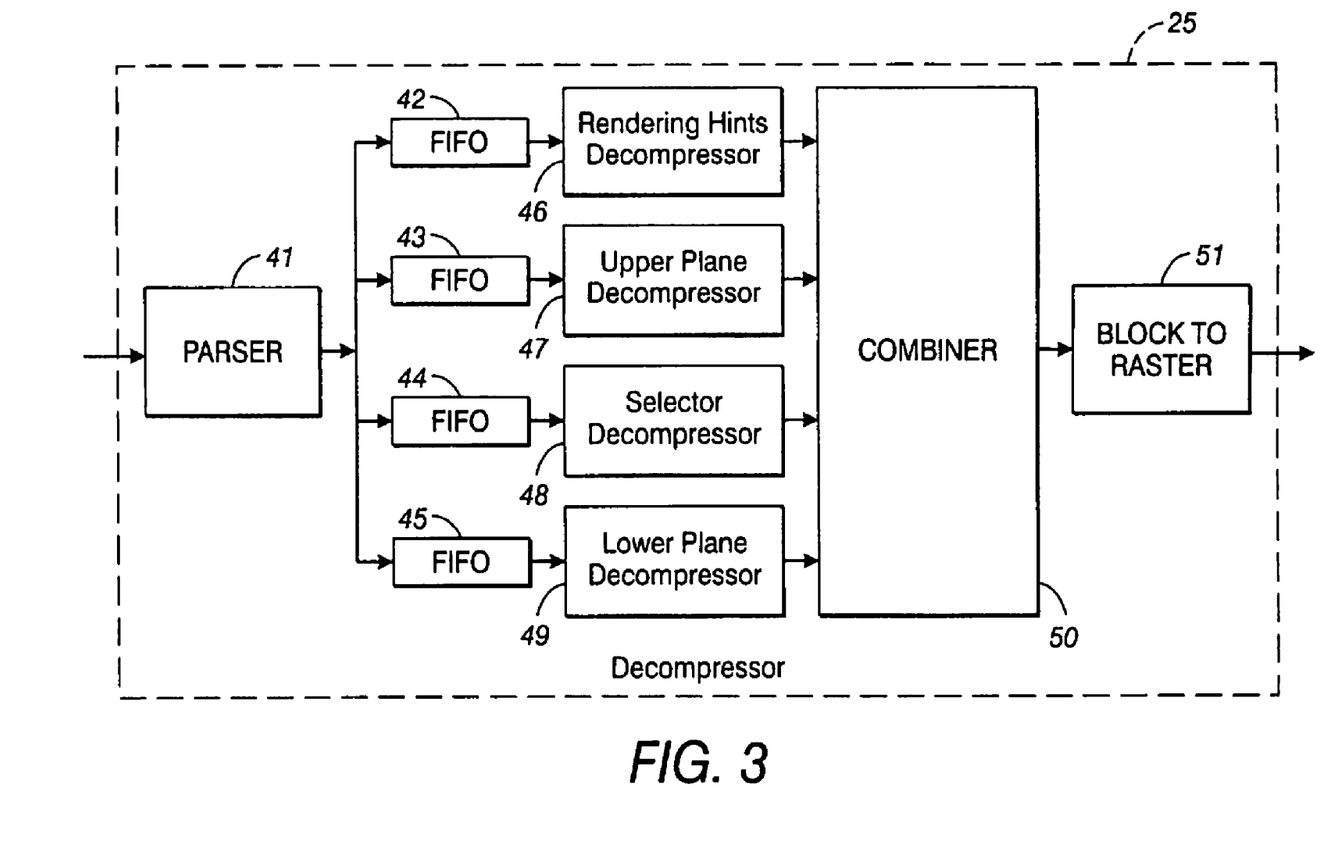
FIG. 3 is a more detailed block diagram of the decompressor.

FIG. 3 is a more detailed diagram of the decompresssor. In this system data is transferred in bands of eight scan lines each. A compressed band of data is read from memory through the DMA engine into the decompressor where it is decompressed back into image data. Printing hints are supplied along with the data, and can specify rendering hints such as halftone screens, and whether the desired image is background (lower plane) or overlay (upper plane).

The parser 41 separates the data into types and supplies the compressed data to the correct channel comprising a FIFO 42-45 and a decompressor 46-49. Each type of data has a decompressor optimized for that type of data. Therefore, a separate decompressor is supplied for rendering hints 46, upper plane or overlay 47 lower plane or background 49, and selector 48 for selecting between the upper and lower plane. The channels are combined onto one strip at the combiner 50, converted from block to raster format 51, and sent out of the decompressor 25 as shown in FIG. 1.

The data on the decompressor output is separated into four separations using the demultiplexer circuit 36 of FIG. 1. Normally, it is to be expected that compressed image data from a memory 20 would be in raster order, but in this case, because the data is JPEG decoded, the data is received from memory 20 in 8 by 8 pixel blocks.

The output of the decompressor is controlled by the multiplexing logic 36, which sends eight consecutive lines to the first buffer 26, then eight to the second buffer 27, etc. Then repeats starting with the first buffer again. There is one buffer for each I/F (i.e., each color separation). The buffers are of sufficient depth to hold a minimum of 16 scanlines of video data and rendering hints. The buffers are loaded 8 lines at a time at a rate of 55 MP/s. The buffers are emptied continuously by the ROS interface at a rate of 13.7 MP/s. The buffers serve two purposes. The first purpose is to provide the buffering necessary to smooth the 8-line burst transfers. The second function is to cover the slight variation of timing between the individual ROS modules. Only valid video data and rendering hints are loaded into the buffers.

The ROS interface controls the transfer of video data and rendering hints to the printer ROS module. There is a ROS interface for each color separation. A state-machine in each ROS interface controls the transfer of video data and rendering hints based on the Page sync and line sync signals from the printer. The ROS interface generates a return line sync and video clock along with the data. Each of the ROS interfaces is independent.

The timing of the high-speed byte-wide interface between the decompressor and the four buffers is controlled by the multiplexing logic 36. The function of the multiplexing logic is to transfer scanlines from the decompressor to the buffers and the ROS I/F of the printer. The multiplexing logic is responsible for demultiplexing the video data and rendering hints by routing each input data strip to the proper buffer.

The interface operates using page request and line request signals driven from the IOT for each color separation. The interface performs a burst transfer of a full scanline of video data and rendering hints for each line request.

Operation of the decompressor begins with the initialization of the buffers to empty and the reset of the multiplexing logic. The I/F then waits for receipt of a page sync from the K separation of the printer.

Upon receiving a page sync from the printer K separation, the K buffer 29 generates a data request to the multiplexing logic. The multiplexing logic activates the K DMA. The multiplexer connects the decompressor output to the K buffer. The eight scanlines of video data and rendering hints (one strip) are transferred to the K buffer.

After eight scanlines of data have been transferred to the K buffer, the multiplexing logic selects the C buffer as the next destination. The C buffer is filled in the same way that the previous buffer was filled The process repeats for the M and Y buffers.

The multiplexing logic then selects the K FIFO. Scanlines are transferred into the K buffer until another eight scanlines are transferred or there is no room in the buffer. If there is no room in the buffer, the buffer must hold off on sending the data request to the multiplexing logic until there is sufficient room in the buffer.

The buffers act as averaging buffers for the decompressor as well as buffers to cover the slight variations in timing between the ROS modules. The buffers must be a minimum of 16 scanlines of video data and rendering hints (two strips). Each line is about 5 K pixels. The printer uses 8 bits of video data per pixel and four bits of rendering hint per pixel. Therefore the size of the buffer for each separation must be 80 K×9. The buffer must have an almost full and an almost empty indicator. The almost full indicator must indicate when there is no longer room for one strip. The almost empty indicator must indicate when there is just one scanline in the buffer.

The buffers are filled at a rate of 55 MP/s and dumped at a rate of 13.7 MP/s. At any given time only one buffer is being filled but all the buffers can and will be dumping simultaneously.

The interface to the printer is controlled by an output state machine on the printer board. Actually, there are four output state machines; one for each color separation. Four state machines are required since the four ROS modules operate independently.

The function of each output state machine is to transfer scanlines from the printer board to the associated ROS module.

Each printer interface operates using page sync and line sync signals driven to the printer ROS module. The printer board transmits video data and rendering hints, line sync and video clock signals.

Operation of the printer board begins with the initialization of the FIFO's to empty and the reset of the output state machines. The command and status signals from the decompressor are passed directly through the printer board to the printer.

Figure 5:
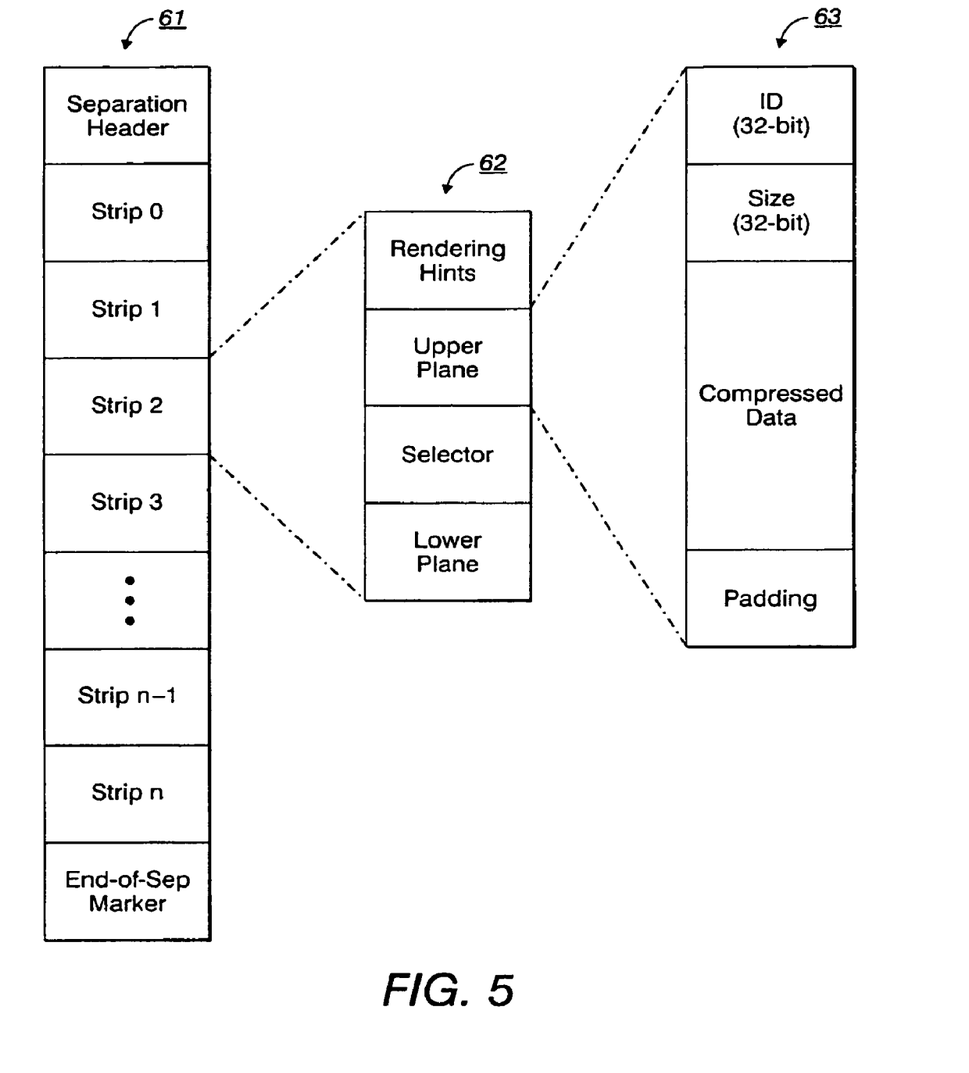
FIG. 5 shows how the compressed data stream is formatted

A color page is typically composed of 4 or 5 color separations. Each separation is divided into strips of 8 scan lines, and is compressed independently. FIG. 5 depicts the separation, strip and substream structures, and shows the types of decompression algorithms that would be used for a color image.

The separation structure 61 contains a separation header, a number of strips, and an end-of-separation marker. The separation header contains page related information such as image size, margin information, Q table, and Huffman table which are not considered as part of the data stream. The host communicates this information to the printer as information on how to decompress the data.

A strip 62 contains multiple substreams and there are as many as four (rendering hints, an upper plane of data, selector instructions, and a lower plane of data). The minimum number is three (rendering hints plus selector and upper or rendering hints plus selector and lower) for a strip that contains JPEG or LZ data only.

Each substream 63 consists of an ID and a byte count. The ID information is used to tag the incoming data to indicate the data as being one of the four substream types, and the byte count provides the length of the substream data. At the end of each substream, if the byte count is not 32-bit word aligned, padding is inserted to pad it to be word aligned so that the next ID can start on a word boundary. Finally, the substream will be divided into 8 by 8 pixel blocks for compression.

Figure 6:
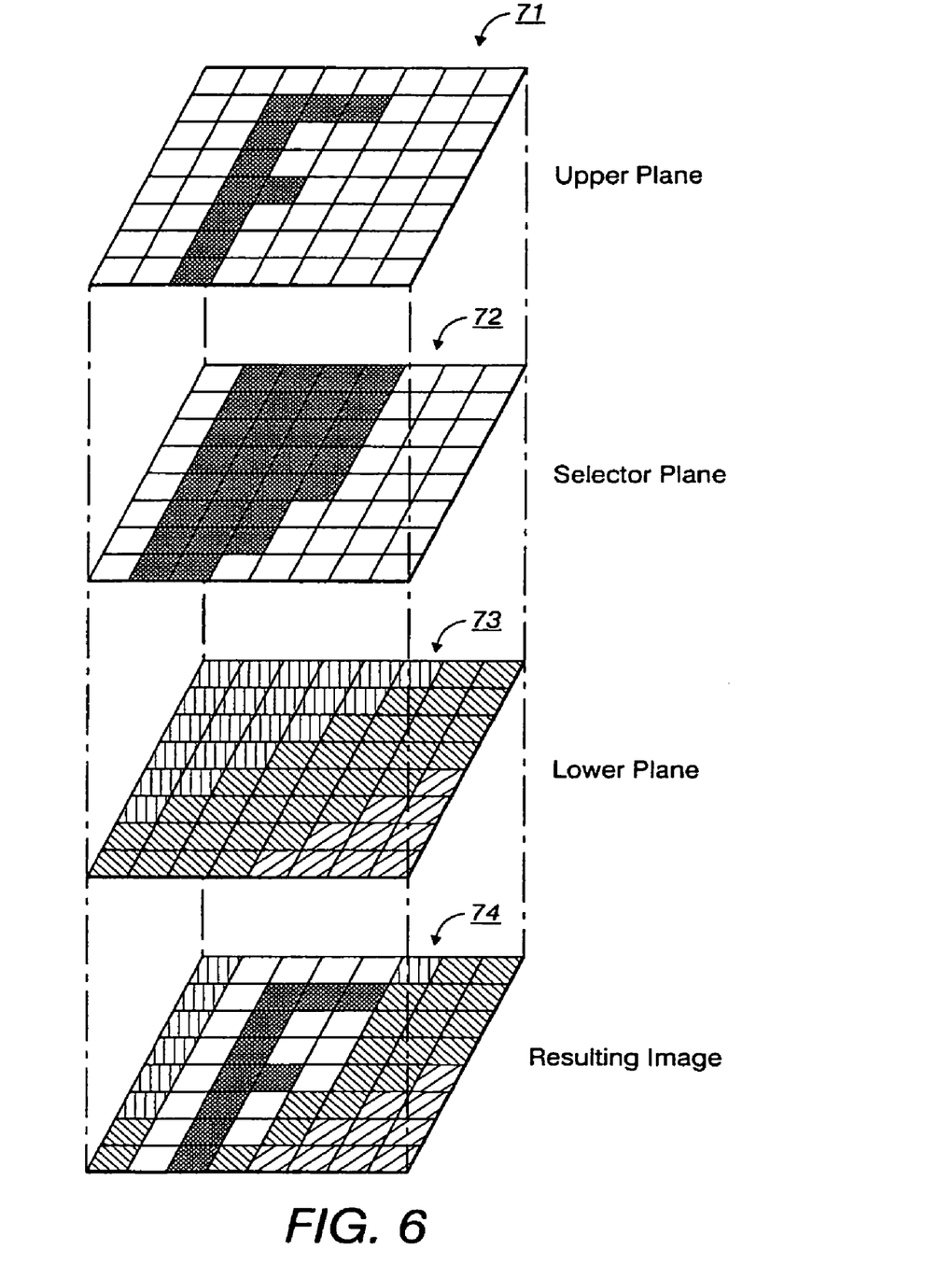
FIG. 6 is an example of generating an image from the compressed data.

In FIG. 6, the text or computer graphics image data is decompressed with a lossless algorithm, such as the Lempel Ziv (LZ) variant, and is referred to as the upper (plane) 71. This algorithm compresses data by building up a history of recent data patterns, and trying to find the current data pattern in the history. If there is a match, the pointer to the most recent occurrence is output rather than the data itself. The amount of compression is dependent on the data, and the amount of compression is not adjustable. If the compression is not sufficient, a lossy compression must be used for some parts of the image. The contone image is decompressed with a lossy algorithm and is called the lower plane 73. Within each 8 by 8 pixel block, the combiner 50 receives instruction data from the selector plane 72, and picks one pixel at a time for the output. As described above, each 8 by 8 pixel block is completely assembled in a block buffer 74. The resulting image block uses upper plane 71 for every place where the selector plane 72 has a black pixel and uses the lower plane 73 for every place where the selector plane has a white pixel. When an entire block is assembled, it is transmitted to a band buffer, and when the band buffer contains an entire scan line of blocks, the entire band is sent to the printer.

There are two additional planes of information in the format. The rendering hints are simply instructions for later hardware blocks on how to print the final image. One simple case would be where the contone should be printed as halftone. Another would be to treat the color as a sweep rather than as a series of lines of gradually differing color. These rendering hints are losslessly compressed and decompressed and simply handed along from one hardware element to the next until they arrive at the point in the system where their function is called for.

The Selector plane is normally losslessly compressed. However, in case of insufficient compression, this channel cannot use a lossy compressor since no bits of data can be lost. The best that can be done here is to recompress the data again if the original compression does not meet the compression guarantees.

JPEG compression uses the Discrete Cosine Transform, quantizes the frequency coefficients, reorders them, and then uses Huffman encoding. The DC term is coded as the difference from the previously compressed block. The amount of compression achieved with JPEG is dependent on the imager and the Q (quantization) tables. In this embodiment, four tables are used. One selection switches between Q tables optimized for line-art or for pictorials. The other selection switches between nominal compression and aggressive compression.

Two kinds of compression are guaranteed in this system, full page and 8-line strip. The full page compression is guaranteed at a ratio of 10:1. This is based on the four planes of data, and is used to reduce the system capacity requirements of disk storage and disk transfer bandwidth. The 8-line strip requirement is 3.2 to 1 and is based on rates of 8:1 for rendering hints (4-bits per pixel), 12:1 for upper plane (8 bits per pixel), 6:1 for the selector plane (1-bit per pixel), and 7:1 for the lower plane (8-bits per pixel).

The compression guarantees are enforced at the time the format is generated. If the data in the upper plane does not compress well enough, the data is compressed in the lower plane. If the selector or rendering hint plane does not meet the guarantee, it is simplified and recompressed.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A time multiplexed image data method, the method comprising:
    dividing each of color separation images into a plurality of strips wherein each strip is individually compressed;
    storing each individually compressed strip into a main memory;
    arbitrating data requests from more than one buffer to determine at least a channel based on priorities of the buffers to use a decompressor;
    accessing and decompressing from the main memory by the decompressor; and
    sending through a demultiplexer which divides a single output stream of decompressed data into more than one separation output stream for delivery to the buffers for supplying data to a print head.

2. The method according to claim 1 further comprising:
    dividing each of the separation images into eight scan lines per strip.

3. The method according to claim 1 further comprising:
    dividing the single output stream of decompressed data into four separation output streams corresponding to four channels of data for delivery into four buffers.

4. The method according to claim 3 further comprising:
    using one decompressor for all of the four channels of data at the same time.

5. The method according to claim 1, wherein each of the color separation images corresponds to a color channel and an amount of buffering required for each color channel is only two strips.

6. The method according to claim 3 further comprising: computing four sets of DMA addresses by the decompressor.

7. The method according to claim 3 further comprising: decompressing the four channels of data at a printer speed.

8. The method according to claim 3 further comprising: using one decompressor for two channels of data at the same time.

9. The method according to claim 1, wherein decompressed image data is available for all four color planes simultaneously.

10. The method according to claim 1, wherein an order that the compressed strips are assessed is not predetermined.

11. The method according to claim 1, further comprising: assembling an entire block of images by using an upper plane for every place where a selector plane has a black pixel and using a lower plane for every place where the selector plane has a white pixel.

12. A circuit for decompressing stored compressed color separation images to be used to drive a color printer having one or more color print heads, comprising:
   a compressor which divides each of the color separation images into strips having a plurality of scan lines, individually compresses each of the strips and stores each compressed strip in a storage,
   a single decompressor for receiving data requests from more than one buffer, arbitrating the data requests to determine at least a channel based on priorities of the buffers to use the single decompressor, decompressing, and outputting in decompressed form stored compressed color separation images,
   a multiplexer for selecting and applying to an input of the single decompressor one or more of the stored compressed color separation images, and
   a demultiplexer for coupling the output of the single decompressor to one of the color print heads having a color that corresponds to a color associated with decompressed stored compressed color separation images.

13. The circuit for decompressing stored compressed color separation images according to claim 12, wherein the single decompressor decompresses two stored compressed color separation images, a first color separation image of a first color and a second color separation image of a second color, each of the first and the second color separation images being decompressed and used to drive a same one of the color print heads.

14. The circuit for decompressing stored compressed color separation images according to claim 12, further comprising a buffer between a decompressor output and each of the color print heads.

15. The circuit for decompressing stored compressed color separation images according to claim 12, further comprising logic means responsive to page and line sync signals, from each of the print heads, for controlling the multiplexer and demultiplexer to couple the color separation image of one color to one of the print heads of the same color.

16. The circuit for decompressing stored compressed color separation images according to claim 12 wherein the image data contains printing hints and an image, and wherein the single decompressor comprises two decompressors, one optimized for printing hints and one optimized for images.

17. The circuit for decompressing stored compressed color separation images according to claim 12, wherein decompressed image data is available for all four color planes simultaneously.

* * * * *